United States Patent
Kawai

(10) Patent No.: US 12,451,962 B2
(45) Date of Patent: Oct. 21, 2025

(54) MONITORING SIGNAL LIGHT OUTPUT APPARATUS, SUBMARINE APPARATUS, AND OPTICAL COMMUNICATION SYSTEM

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 572 days.

(21) Appl. No.: 17/800,964

(22) PCT Filed: Mar. 2, 2021

(86) PCT No.: PCT/JP2021/007970
§ 371 (c)(1),
(2) Date: Aug. 19, 2022

(87) PCT Pub. No.: WO2021/177309
PCT Pub. Date: Sep. 10, 2021

(65) Prior Publication Data
US 2023/0076588 A1 Mar. 9, 2023

(30) Foreign Application Priority Data
Mar. 2, 2020 (JP) .................. 2020-034976

(51) Int. Cl.
*H04B 10/29* (2013.01)
*H04B 10/077* (2013.01)
*H04B 10/80* (2013.01)
*H04J 14/02* (2006.01)
*H04B 10/07* (2013.01)
*H04B 10/297* (2013.01)

(52) U.S. Cl.
CPC .......... *H04B 10/077* (2013.01); *H04B 10/80* (2013.01); *H04J 14/0305* (2023.08);
(Continued)

(58) Field of Classification Search
CPC .. H04B 10/077; H04B 10/80; H04B 10/2587; H04B 10/07; H04B 10/29; H04B 10/297; H04B 10/2971; H04J 14/0305
(Continued)

(56) References Cited

U.S. PATENT DOCUMENTS 6,292,602 B1 * 9/2001 Suzuki ............... H04J 14/0297
385/24
6,400,475 B1 * 6/2002 Kosaka ........... H04B 10/07955
359/337

(Continued)

FOREIGN PATENT DOCUMENTS

JP H02-253747 A 10/1990
JP H02-270427 A 11/1990
(Continued)

OTHER PUBLICATIONS

Suzuki, JP 2000278248 A, Oct. 2000, Japan Patent Office, All Document. (Year: 2000).*
(Continued)

Primary Examiner — Dibson J Sanchez

(57) ABSTRACT

An object is to provide a monitoring signal light output apparatus capable of transmitting a monitoring signal light with a simple configuration. An optical demultiplexer (11) is inserted into an optical fiber (F1) and demultiplexes a monitoring signal light (M1) transmitted through the optical fiber (F1). A SOA (13) amplifies and modulates the monitoring signal light (M1) separated by the optical demultiplexer (11). A control unit (15) outputs a signal (Si) indicating a state of a submarine apparatus. A SOA drive unit (14) outputs a drive signal (S2) to the SOA (13) in response to the signal (Si) to perform a modulation operation of the monitoring signal light (M1). An optical multiplexer (17) multiplexes the monitoring signal light (M1) amplified and modulated by the SOA (13) into the signal light transmitted (Continued)

by the optical fiber (F1). The monitoring signal light output apparatus is mounted on the submarine apparatus.

4 Claims, 5 Drawing Sheets

(52) U.S. Cl.
CPC .............. *H04B 10/07* (2013.01); *H04B 10/29* (2013.01); *H04B 10/297* (2013.01); *H04B 10/2971* (2013.01)

(58) Field of Classification Search
USPC ....................................... 398/9–38, 173–181
See application file for complete search history.

(56) References Cited

U.S. PATENT DOCUMENTS

| | | | | |
|---|---|---|---|---|
| 6,469,826 B1* | 10/2002 | Masuda | ............... | H04B 10/294 359/337.2 |
| 6,873,456 B2* | 3/2005 | Motoshima | ........ | H04B 10/2941 359/341.41 |
| 8,503,881 B1* | 8/2013 | Li | ........................ | H04B 10/506 398/91 |
| 2003/0072076 A1* | 4/2003 | Yoon | ......................... | H01S 5/50 359/344 |
| 2013/0101297 A1* | 4/2013 | Brenot | ................. | H04B 10/291 359/341.1 |
| 2015/0381302 A1* | 12/2015 | Brenot | ................ | H04J 14/0201 398/83 |
| 2016/0329964 A1* | 11/2016 | Vojtech | .............. | H04B 10/2589 |
| 2017/0214484 A1* | 7/2017 | Zhang | ................. | H04B 10/294 |

FOREIGN PATENT DOCUMENTS

| | | |
|---|---|---|
| JP | 2000-278248 A | 10/2000 |
| JP | 2008-288849 A | 11/2008 |
| JP | 2008-294818 A | 12/2008 |

OTHER PUBLICATIONS

International Search Report for PCT Application No. PCT/JP2021/007970, mailed on May 25, 2021.

* cited by examiner

MONITORING SIGNAL LIGHT OUTPUT APPARATUS, SUBMARINE APPARATUS, AND OPTICAL COMMUNICATION SYSTEM

This application is a National Stage Entry of PCT/JP2021/007970 filed on Mar. 2, 2021, which claims priority from Japanese Patent Application 2020-034976 filed on Mar. 2, 2020, the contents of all of which are incorporated herein by reference, in their entirety.

TECHNICAL FIELD

The present invention relates to a monitoring signal light output apparatus, a submarine apparatus, and an optical communication system.

BACKGROUND ART

As the diversification of networks in submarine optical cable systems proceeds, the functions of submarine apparatus such as a repeater, a branch device, and a ROADM (Reconfigurable Optical Add/Drop Multiplexer) device are enhanced. Accordingly, there is a need for a function of monitoring the transmission quality of signal light such as the state of submarine apparatus, and the spectrum state of signal light and transmitting the monitoring result.

As a method of transmitting such a monitoring result, there has been proposed a submarine optical cable system in which transmitting means is provided in a submarine apparatus such as an optical repeater, a monitoring signal that is an electric signal indicating the monitoring result is converted into a signal light, and then the converted signal light is output to a land station or the like through an optical fiber (Patent Literatures 1 and 2). In this system, the signal light superimposed with the monitoring signal is transmitted from a terminal station apparatus to a submarine apparatus, and the transmitted signal is converted into an electric signal and frequency-separated by a receiver provided in the submarine apparatus to separate the monitoring signal. The monitoring signal is modulated based on information such as a state of the submarine apparatus, the modulated monitoring signal is converted into a signal light, and the converted signal light is transmitted to the terminal station apparatus through the optical fiber.

CITATION LIST

Patent Literature

[Patent Literature 1] Japanese Unexamined Patent Application Publication No. H2-270427
[Patent Literature 2] Japanese Unexamined Patent Application Publication No. H2-253747

SUMMARY OF INVENTION

Technical Problem

In the above-described submarine optical cable system, it is necessary to provide an optical component such as a laser light source, a wavelength control mechanism and a modulator in the submarine apparatus to convert the electric signal into the signal light and transmit the monitoring signal light by transmitting means provided in the submarine apparatus. Further, to receive the monitoring signal by performing frequency separation after converting the received signal light into the electric signal, it is necessary to provide a mechanism for performing photoelectric conversion and frequency separation. Furthermore, to ensure the quality of the monitoring signal light, strict tolerances and operation periods are required for the wavelength control of the monitoring signal light. Therefore, it is inevitable to increase the size and power consumption of the submarine apparatus, and it also leads to a decrease in reliability due to an increase in the number of components.

As another method of transmitting the monitoring signal light, it is also conceivable to output the monitoring light of the exclusive wavelength from a terminal station such as a landing station and modulate it by an optical switch or a modulator provided in the submarine apparatus. However, in this method, there is a problem that the light intensity of the monitoring signal light is lowered due to the loss caused by the optical switch or the modulator.

It is also conceivable to provide an optical amplifier such as an optical fiber amplifier in the submarine apparatus, modulate the excitation laser to modulate the entire signal light, and superimpose a monitor signal on the signal light. However, a dedicated optical amplifier needs to be provided, which increases the number of components and leads to an increase in the size of the submarine apparatus, an increase in power consumption, and a decrease in reliability.

An object of the present invention to provide a monitoring signal light output apparatus capable of transmitting a monitoring signal light with a simple configuration.

Solution to Problem

An aspect of the present invention is a monitoring signal light output apparatus including: a first optical demultiplexer inserted into a first optical fiber included in a submarine optical cable into which a submarine apparatus is inserted and configured to demultiplex a first monitoring signal light transmitted by the first optical fiber; a semiconductor optical amplifier configured to amplify the first monitoring signal light separated by the first optical demultiplexer and modulate the first monitoring signal light; a control unit configured to output a control signal indicating a state of the submarine apparatus; a drive unit configured to output a drive signal to the semiconductor optical amplifier in response to the control signal to perform a modulation operation of the first monitoring signal light; and a first optical multiplexer configured to multiplex the first monitoring signal light amplified and modulated by the semiconductor optical amplifier into the signal light transmitted by the first optical fiber, in which the monitoring signal light output apparatus is mounted on the submarine apparatus.

An aspect of the present invention is a submarine apparatus including: an optical demultiplexer inserted into an optical fiber included in a submarine optical cable and configured to demultiplex a monitoring signal light transmitted by the optical fiber; a semiconductor optical amplifier configured to amplify the monitoring signal light separated by the optical demultiplexer and modulate the monitoring signal light; a control unit configured to output a control signal indicating a state of the submarine apparatus; a drive unit configured to output a drive signal to the semiconductor optical amplifier in response to the control signal to perform a modulation operation of the monitoring signal light; and an optical multiplexer configured to multiplex the monitoring signal light amplified and modulated by the semiconductor optical amplifier to the signal light transmitted by the optical fiber.

An aspect of the present invention is an optical communication system including: a submarine optical cable connecting a first optical transmission apparatus and a second optical transmission apparatus; and a submarine apparatus inserted into the submarine optical cable, in which the submarine apparatus includes: an optical demultiplexer inserted into an optical fiber included in the submarine optical cable, and configured to demultiplex a monitoring signal light output from the first optical transmission apparatus and transmitted through the optical fiber; a semiconductor optical amplifier configured to amplify the monitoring signal light separated by the optical demultiplexer and modulate the monitoring signal light; a control unit configured to output a control signal indicating a state of the submarine apparatus; a drive unit configured to output a drive signal to the semiconductor optical amplifier in response to the control signal to perform a modulation operation of the monitoring signal light; and an optical multiplexer configured to multiplex the monitoring signal light amplified and modulated by the semiconductor optical amplifier to the signal light transmitted by the optical fiber and output the multiplexed signal light to the second optical transmission apparatus.

Advantageous Effects of Invention

According to the present invention, it is possible to provide a monitoring signal light output apparatus capable of transmitting a monitoring signal light with a simple configuration.

EXAMPLE OF EMBODIMENT

Figure 1:
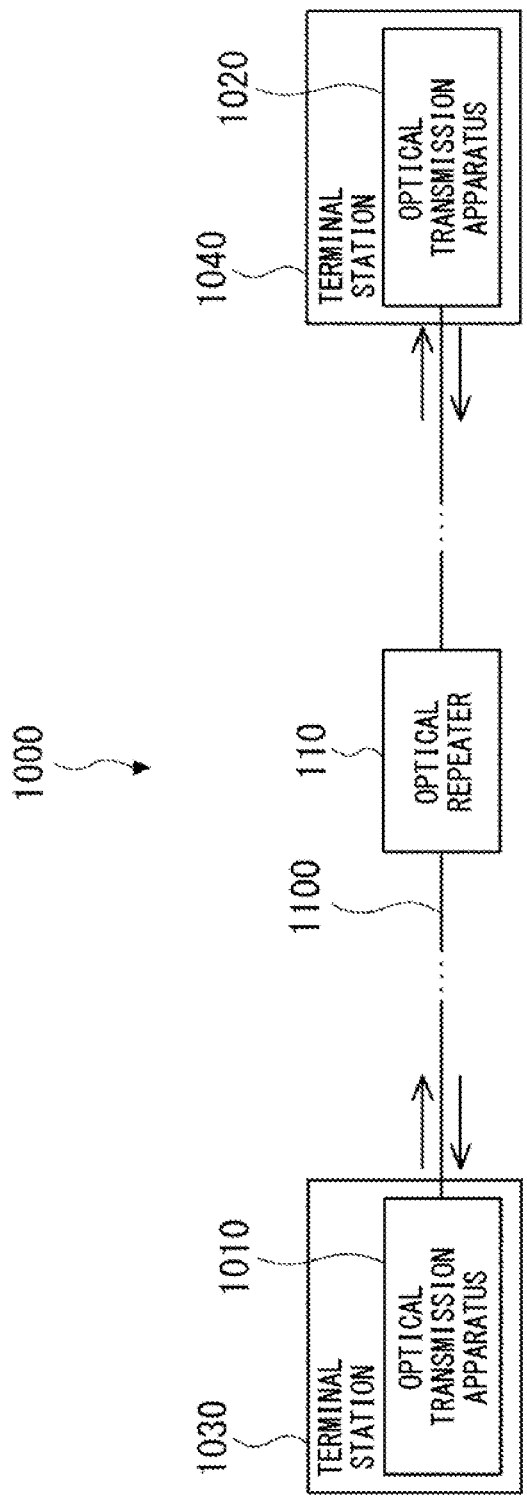
FIG. 1 is a diagram showing a basic configuration of an optical communication system including a monitoring signal light output apparatus according to a first example embodiment.

Example embodiments of the present invention will be described below with reference to the drawings. The same components are denoted by the same reference numerals throughout the drawings, and a repeated explanation is omitted as needed.

First Example Embodiment

A monitoring signal light output apparatus according to a first example embodiment will be described. The monitoring signal light output apparatus according to the present example embodiment is provided in an apparatus such as an optical repeater, an optical branch/insertion apparatus, and a ROADM apparatus that is inserted into an optical cable containing a plurality of optical fibers for connecting a plurality of optical transmission apparatuses provided in a plurality of terminal stations. This optical cable is, for example, a submarine optical cable laid on the seabed. In this case, the monitoring signal light output apparatus is provided in a submarine apparatus such as an optical repeater, an optical branch/insertion apparatus, and a ROADM apparatus.

In the following description, it is assumed that the monitoring signal light output apparatus 100 according to the first example embodiment is provided in the optical repeater 110. The monitoring signal light output apparatus 100 is not limited to being mounted on the optical repeater, and it may be mounted on various optical apparatuses such as an optical branch/insertion apparatus and a ROADM apparatus.

FIG. 1 shows a basic configuration of an optical communication system 1000 including the monitoring signal light output apparatus 100 according to the first example embodiment. The optical communication system 1000 includes an optical transmission apparatus 1010 provided in one terminal station 1030, an optical transmission apparatus 1020 provided in the other terminal station 1040, an optical cable 1100, and the optical repeater 110. The terminal stations 1030 and 1040 are provided, for example, as landing stations of a submarine optical cable.

The optical transmission apparatus 1010 (also referred to as a first optical transmission apparatus) and an optical transmission apparatus 1020 (also referred to as a second optical transmission apparatus) are connected by the optical cable 1100 containing a plurality of optical fibers. The optical transmission apparatuses 1010 and 1020 are provided with one or more transponders capable of transmitting and receiving signal lights, an optical multiplexer/demultiplexer circuit, or the like, and are configured to perform bidirectional optical communication through the optical cable 1100.

An optical repeater 110 is inserted into the optical cable 1100 to amplify a signal light attenuated by transmission.

Figure 2:
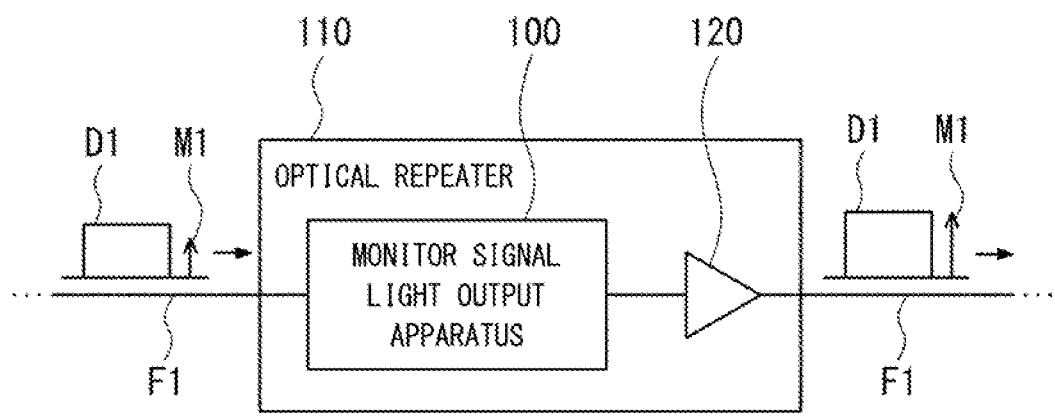
FIG. 2 is a diagram schematically showing a configuration of an optical repeater according to the first example embodiment.

Next, a configuration of the optical repeater 110 according to the first example embodiment will be described. FIG. 2 schematically shows the configuration of the optical repeater 110 according to the first example embodiment. In FIG. 2, only an optical fiber F1 (also referred to as a first optical fiber) used for downlink communication from the optical transmission apparatus 1010 to the optical transmission apparatus 1020 included in the optical fibers contained in the optical cable 1100 is shown for the sake of simplification of the drawings and description. The optical repeater 110 includes the monitoring signal light output apparatus 100 inserted into the optical fiber F1.

In the optical repeater 110, which is an example of a submarine apparatus, an optical amplifier may be inserted into the optical fiber F1, for example, to compensate for attenuation of the signal light transmitted by the optical fiber F1. In FIG. 2, for example, an optical amplifier 120 is inserted between the output side of the monitoring signal light output apparatus 100, that is, between the monitoring signal light output apparatus 100 and the optical transmission apparatus 1020.

The optical amplifier 120 is configured, for example, as an erbium-doped fiber amplifier (EDFA). The EDFA outputs an excitation light from an excitation light source to an erbium-doped fiber (EDF) to excite the EDF. Then, when the signal light is input to the EDF, the signal light is amplified. The optical amplifier 120 amplifies the input light and outputs the amplified light to the optical transmission apparatus 1020 through the optical fiber F1.

The optical transmission apparatus 1010 outputs a data signal light D1 modulated according to the communication data and a monitoring signal light M1 (also referred to as a first monitoring signal light) to the monitoring signal light output apparatus 100 of the optical repeater 110 through the optical fiber F1. The monitoring signal light M1 is output as an unmodulated signal light of a wavelength band different from that of the data signal light D1.

The monitoring signal light output apparatus 100 modulates the monitoring signal light M1 to transmit information indicating the state of the optical repeater 110 by the monitoring signal light M1, and outputs the modulated monitoring signal light M1 and the data signal light D1. In this example, the modulated monitoring signal light M1 and the data signal light D1 are amplified by the optical amplifier 120 and then output to the optical transmission apparatus 1020.

Figure 3:
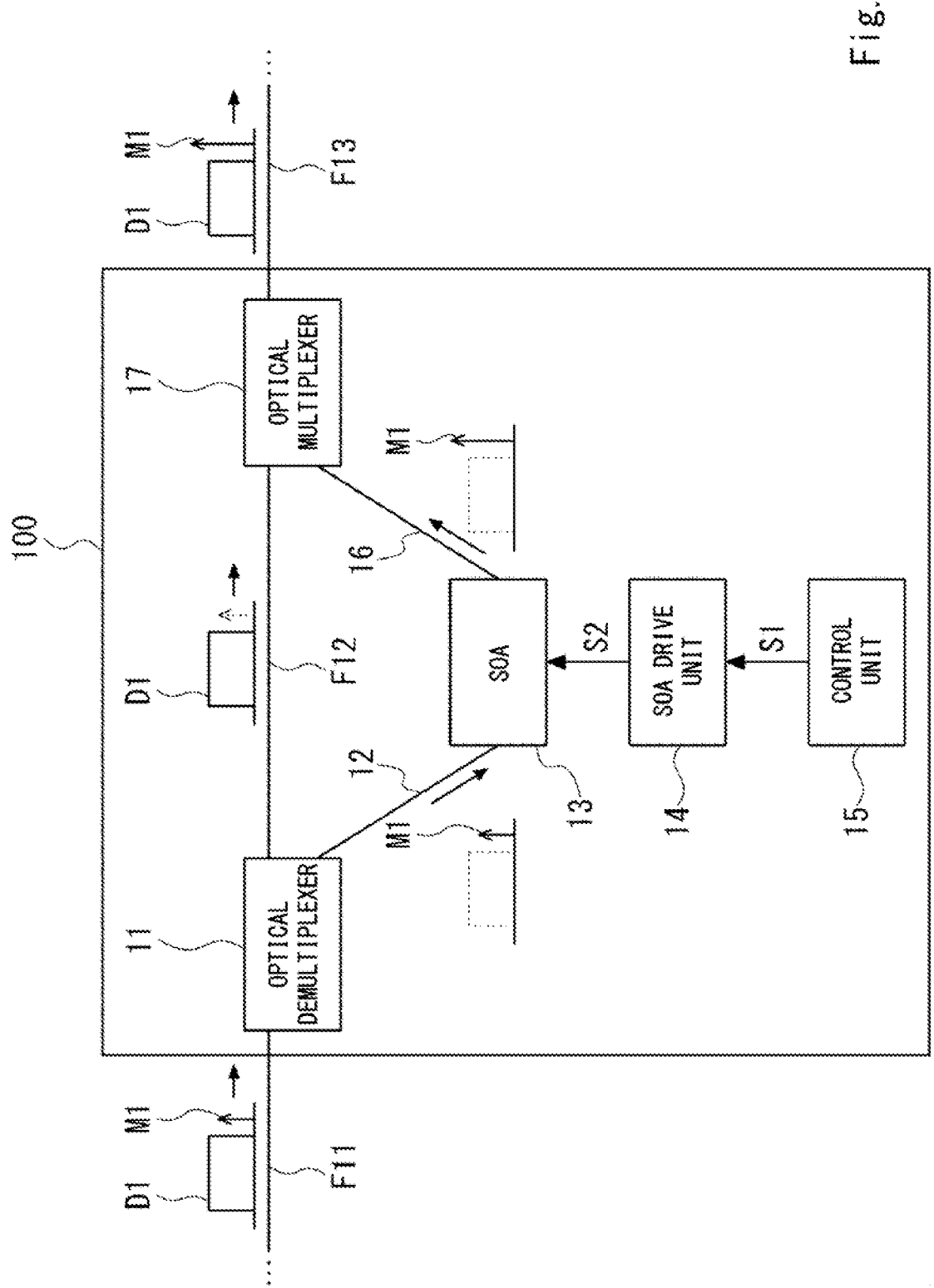
FIG. 3 is a diagram schematically showing a configuration of the monitoring signal light output apparatus according to the first example embodiment.

Next, a configuration of the monitoring signal light output apparatus 100 will be described. FIG. 3 schematically shows the configuration of the monitoring signal light output apparatus 100 according to the first example embodiment. The monitoring signal light output apparatus 100 includes an optical demultiplexer 11, an optical transmission line 12, a semiconductor optical amplifier (SOA) 13, an SOA drive unit 14, a control unit 15, an optical transmission line 16, and an optical multiplexer 17.

As shown in FIG. 3, in the optical fiber F1, the optical demultiplexer 11 (also referred to as a first optical demultiplexer) is inserted on the side of the optical transmission apparatus 1010, and the optical multiplexer 17 (also referred to as a first optical multiplexer) is inserted on the side of the optical transmission apparatus 1020. In FIG. 3, for convenience, the optical fiber F1 connecting the optical transmission apparatus 1010 and the optical demultiplexer 11 is referred to as an optical fiber F11, the optical fiber F1 connecting the optical demultiplexer 11 and the optical multiplexer 17 is referred to as an optical fiber F12, and the optical fiber F1 connecting the optical multiplexer 17 and the optical transmission apparatus 1020 is referred to as an optical fiber F13.

The data signal light D1 and the monitoring signal light M1 output from the optical transmission apparatus 1010 are input to the optical demultiplexer 11 through the optical fiber F11. The optical demultiplexer 11 is configured as an optical switch such as a WSS (Wavelength Selective Switch) for selectively wavelength-separating an input signal light. The optical demultiplexer 11 selectively wavelength-separates the monitoring signal light M1 and outputs the separated light to the optical transmission line 12 that is a branching path. The separated monitoring signal light M1 is output to the SOA 13 through the optical transmission line 12. The data signal light D1 is output to the optical multiplexer 17 through the optical fiber F12.

The control unit 15 monitors the state of the optical repeater 110 and outputs a signal S1 indicating the monitoring result to the SOA drive unit 14. As described above, the state of the optical repeater to be monitored is, for example, an input/output level of the optical amplifier 120 provided in the optical repeater 110, an excitation light output level of the excitation light source, and a current value of the excitation light source.

The SOA drive unit 14 outputs a drive signal S2 to the SOA 13 to drive the SOA 13 so as to perform a modulation operation in response to the signal S1.

The SOA 13 amplifies the monitoring signal light M1 to a predetermined intensity to compensate for the attenuation of the monitoring signal light M1 by the transmission. The SOA 13 modulates the monitoring signal light M1 in response to the drive signal S2. Thus, the monitoring signal light M1 is output from the SOA 13 as a signal light indicating the state of the optical repeater 110.

The monitoring signal light M1 output from the SOA 13 is output to the optical multiplexer 17 through the optical transmission line 16. The optical multiplexer 17 multiplexes the input data signal light D1 and the monitoring signal light M1 and outputs the multiplexed signal lights. The optical amplifier 120 amplifies the monitoring signal light M1 and the data signal light D1 output from the optical multiplexer 17 and outputs the amplified signal lights to the optical transmission apparatus 1020.

As described above, according to the present configuration, the monitoring signal light output from the optical transmission apparatus 1010 is modulated by the monitoring signal light output apparatus, so that the state of the optical repeater can be transmitted to an external apparatus by the monitoring signal light.

Further, since the monitoring signal light can be amplified to a sufficient intensity by the SOA, it is possible to transmit the monitoring signal light to a counterpart, for example, the optical transmission apparatus 1020 or the like, while maintaining a desired signal quality.

In the present configuration, the monitoring signal light is generated not by a submarine apparatus such as an optical repeater, but by an optical transmission apparatus provided in a land station or the like. Therefore, a light source necessary for generating the monitoring signal light and a wavelength control mechanism for the signal light may not be provided in the submarine apparatus. Therefore, it is possible to realize miniaturization, low power consumption and high reliability of the submarine apparatus.

In the present configuration, although the SOA 13 is provided as the optical amplifier, since it is not necessary to provide the optical amplifier and the modulator separately, the number of parts can be reduced in comparison with the general method described above, which is advantageous from the viewpoint of miniaturization, low power consumption and high reliability of the submarine apparatus. In addition, the SOA is advantageous from the viewpoint of suppressing the dimension of the submarine apparatus because the dimension is smaller than that of an optical fiber amplifier such as an EDFA.

Second Example Embodiment

Figure 4:
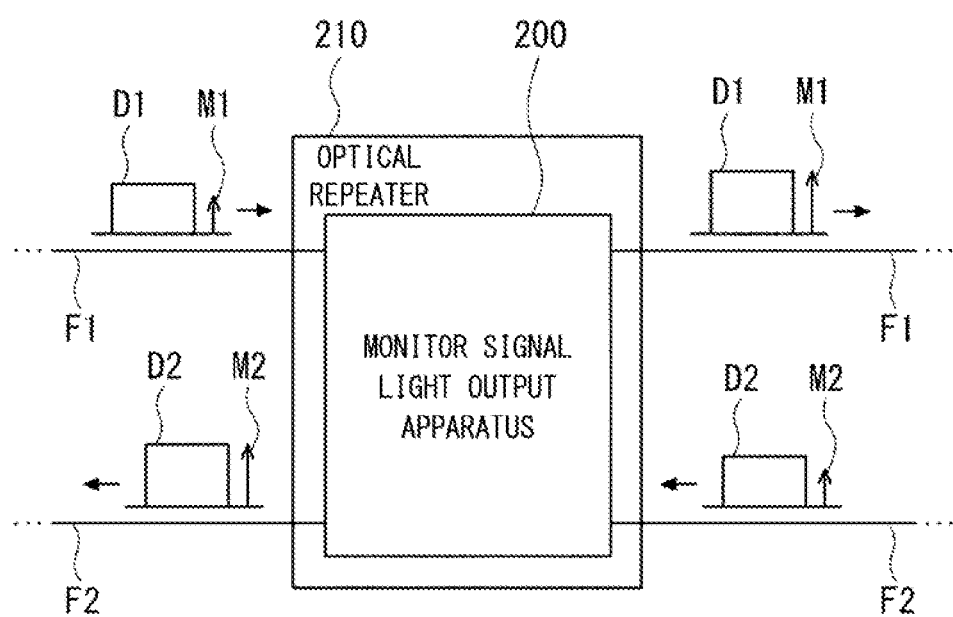
FIG. 4 is a diagram schematically showing a configuration of an optical repeater according to a second example embodiment.

In the first example embodiment, the transmission of the monitoring signal light through the optical fiber used for the downlink communication has been described. In contrast, in the present example embodiment, transmission of a monitoring signal light through an optical fiber pair used for downlink communication and uplink communication will be described. FIG. 4 schematically shows a configuration of an optical repeater 210 according to a second example embodiment. The optical repeater 210 has the optical fibers F1 and F2 and a monitoring signal light output apparatus 200. In FIG. 4, other configurations including the optical amplifier 120 are omitted for simplification of the description.

The optical fiber F1 is the optical fiber used for the downlink communication from the optical transmission apparatus 1010 to the optical transmission apparatus 1020 as in the first example embodiment. The optical fiber F2 (also referred to as a second optical fiber) is the optical fiber used for upstream communication from the optical transmission apparatus 1020 to the optical transmission apparatus 1010. The monitoring signal light output apparatus 200 is inserted into the optical fibers F1 and F2.

The optical transmission apparatus 1010 outputs the data signal light D1 modulated according to the communication data and the monitoring signal light M1 to the monitoring signal light output apparatus 200 of the optical repeater 210 through the optical fiber F1. The optical transmission apparatus 1020 outputs a data signal light D2 modulated according to the communication data and a monitoring signal light M2 (also referred to as a second monitoring signal light) to the monitoring signal light output apparatus 200 of the optical repeater 210 through the optical fiber F2. The monitoring signal lights M1 and M2 are output as unmodulated signal lights of wavelength bands respectively different from those of the data signal lights D1 and D2.

Figure 5:
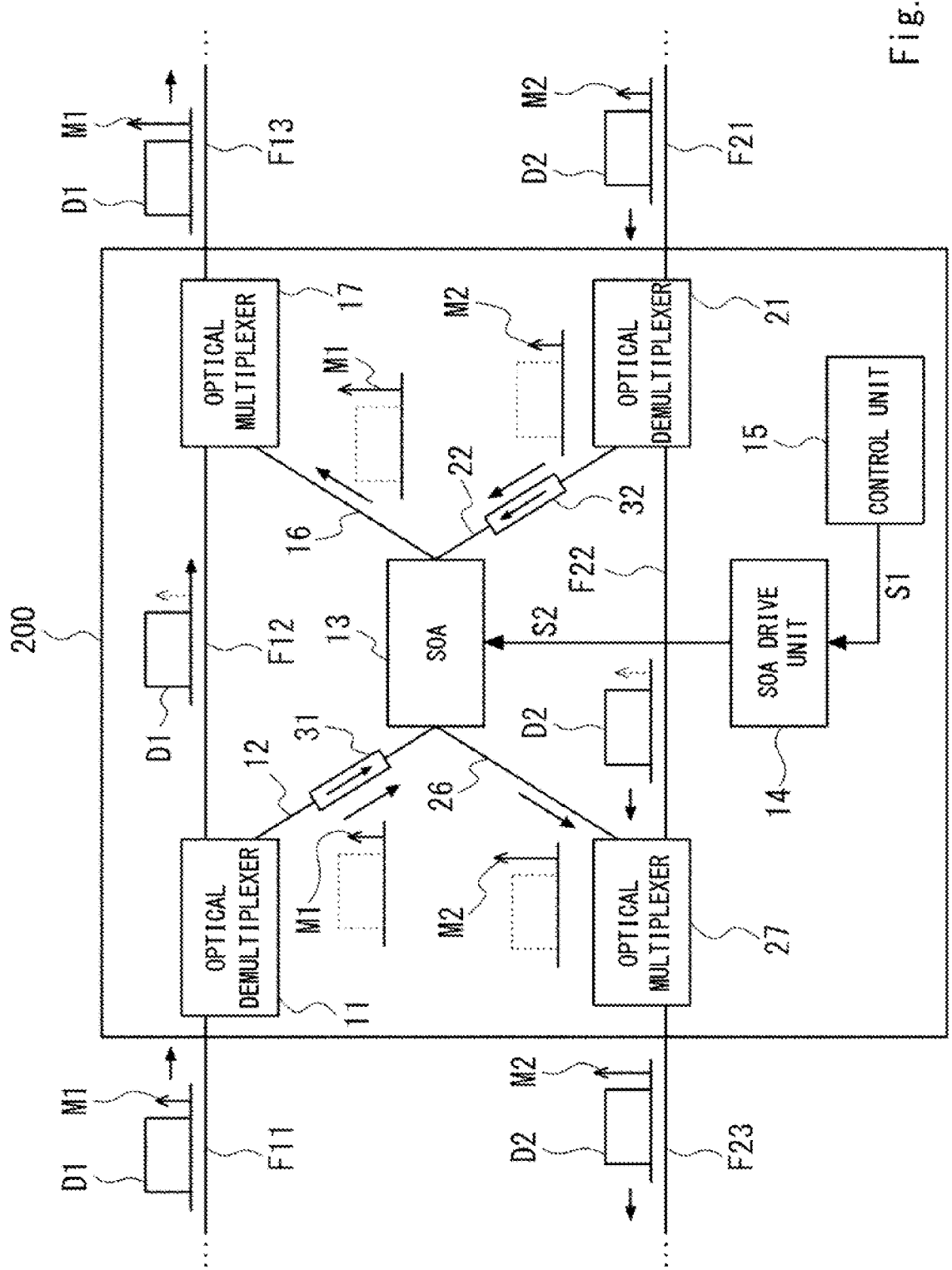
FIG. 5 is a diagram schematically showing a configuration of a monitoring signal light output apparatus according to the second example embodiment.

FIG. 5 schematically shows a configuration of the monitoring signal light output apparatus 200 according to the second example embodiment. The monitoring signal light output apparatus 200 has a configuration in which an optical demultiplexer 21, optical transmission lines 22 and 26, an optical multiplexer 27, and optical isolators 31 and 32 are added to the monitoring signal light output apparatus 100.

In the optical fiber F2, the optical demultiplexer 21 (also referred to as a second optical demultiplexer) is inserted on the side of the optical transmission apparatus 1020, and the optical multiplexer 27 (also referred to as a second optical multiplexer) is inserted on the side of the optical transmission apparatus 1010.

In FIG. 5, for convenience, the optical fiber F2 connecting the optical transmission apparatus 1020 and the optical demultiplexer 21 is referred to as an optical fiber F21, the optical fiber F2 connecting the optical demultiplexer 21 and the optical multiplexer 27 is referred to as an optical fiber F22, and the optical fiber F2 connecting the optical multiplexer 27 and the optical transmission apparatus 1010 is referred to as an optical fiber F23.

The optical fibers F11 to F13 constituting the optical fiber F1 are the same as those in the first example embodiment, and therefore the description thereof will be omitted.

The data signal light D2 and the monitoring signal light M2 output from the optical transmission apparatus 1020 are input to the optical demultiplexer 21 through the optical fiber F21. Similar to the optical demultiplexer 11, the optical demultiplexer 21 is configured as an optical switch such as a WSS for selectively wavelength-separating input signal light. The optical demultiplexer 21 selectively wavelength-separates the monitoring signal light M2 and outputs the separated signal light to the optical transmission line 22 that is a branching path. The separated monitoring signal light M2 is output to the SOA 13 through the optical transmission line 22. The data signal light D2 is output to the optical multiplexer 27 through the optical fiber F22.

The monitoring signal light M1 and the monitoring signal light M2 may be signal lights having the same wavelength band or signal lights having different wavelength bands.

The control unit 15 monitors the state of the optical repeater 210 as in the first example embodiment, and outputs the signal S1 indicating the monitoring result to the SOA driving unit 14. The SOA driving unit 14 outputs the drive signal S2 to drive the SOA 13 so as to perform a modulation operation in response to the signal S1.

The SOA 13 amplifies the monitoring signal lights M1 and M2 to a predetermined intensity to compensate for the attenuation of the monitoring signal lights M1 and M2 by transmission. The SOA 13 modulates the monitoring signal lights M1 and M2 in response to the drive signal S2. Thus, the monitoring signal lights M1 and M2 are output from the SOA 13 as signal lights indicating the state of the optical repeater 210.

It goes without saying that the SOA 13 can separately modulate the monitoring signal light M1 and the monitoring signal light M2 when the input timings of the monitoring signal light M1 and the monitoring signal light M2 are different. The monitoring signal lights M1 and M2 can be modulated using any modulation scheme applicable to the SOA. Further, the SOA 13 may amplify the monitoring signal light M1 and the monitoring signal light M2 at the same amplification factor or at different amplification factors.

In the present configuration, the optical isolator 31 (also referred to as a first optical isolator) is inserted into the optical transmission line 12, and the optical isolator 32 (also referred to as a second optical isolator) is inserted into the optical transmission line 26. As a result, it is possible to prevent the monitoring signal light M1 output from the SOA 13 from propagating through the optical transmission line 22 in the reverse direction through the optical fiber F2 for the uplink communication. Further, it is possible to prevent the monitoring signal light M2 output from the SOA 13 from propagating in the reverse direction through the optical transmission line 12 through the optical fiber F1 for the downlink communication.

The monitoring signal light M2 output from the SOA 13 is output to the optical multiplexer 27 through the optical transmission line 26. The optical multiplexer 27 multiplexes the input data signal light D2 and the monitoring signal light M2 and output the multiplexed signal lights. Note that the monitoring signal light M1 output from the SOA 13 is the same as that of the first example embodiment, and therefore the description thereof will be omitted.

Although not shown, an optical amplifier may be inserted into the optical fiber F23, and the inserted optical amplifier amplifies the monitoring signal light M2 and the data signal light D2 output from the optical multiplexer 27 and outputs the amplified signal lights to the optical transmission apparatus 1010 through the optical fiber F23.

As described above, according to the present configuration, by transmitting the monitoring signal light through the uplink communication path and the downlink communication path, it is possible to transmit the state of the submarine apparatus such as an optical repeater to an external apparatus.

As in the first example embodiment, since the monitoring signal light is generated by the optical transmission apparatus provided in the land station or the like, the monitoring signal light can be output to both the upstream communication path and the downstream communication path without providing a light source necessary for generating the monitoring signal light or a wavelength control mechanism for the signal light or the like in the submarine apparatus. As a result, it is possible to realize a redundant configuration in which the monitoring result of the optical repeater can be transmitted even when there is a fault in one of the upstream communication path and the downstream communication path.

As described above, in the present configuration, as in the first example embodiment, miniaturization, low power consumption, and high reliability of optical apparatuses such as submarine apparatuses can be realized.

OTHER EXAMPLE EMBODIMENTS

The present invention is not limited to the above-described exemplary embodiments, and can be modified as appropriate without departing from the scope of the invention. For example, the optical transmission line provided in the optical repeater may be an optical fiber or any optical transmission line such as a quartz waveguide other than the optical fiber.

Although the optical repeater as an example of a submarine apparatus has been described in the above embodiment, the monitoring signal light output apparatus described above can also be applied to other submarine apparatuses such as an optical branching apparatus and a ROADM apparatus. For example, in the case of the optical branching apparatus, the state of the optical switch or the electric relay provided in the branching apparatus is transmitted by the monitoring signal light. In the case of the ROADM apparatus, the state of the optical switch such as a WSS provided in the ROADM apparatus and the monitoring result of the spectrum are transmitted by the monitoring signal light.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2020-34976, filed Mar. 2, 2020, the disclosure of which is incorporated herein in its entirety by reference.

REFERENCE SIGNS LIST 11, 21 OPTICAL DEMULTIPLEXERS
12, 22 OPTICAL TRANSMISSION LINES
13 SEMICONDUCTOR OPTICAL AMPLIFIER (SOA)
14 SOA DRIVE UNIT
15 CONTROL UNIT
16, 26 OPTICAL TRANSMISSION LINES
17, 27 OPTICAL MULTIPLEXERS
31, 32 OPTICAL ISOLATORS
100, 200 MONITORING SIGNAL LIGHT OUTPUT APPARATUSES
110, 210 OPTICAL REPEATERS
120 OPTICAL AMPLIFIER
F1, F11 TO F13, F2, F21 TO F23 OPTICAL FIBERS
1000 OPTICAL COMMUNICATION SYSTEM
1010, 1020 OPTICAL TRANSMISSION APPARATUSES
1100 OPTICAL CABLE
D1, D2 DATA SIGNAL LIGHTS
M1, M2 MONITORING SIGNAL LIGHTS
S1 SIGNAL
S2 DRIVE SIGNAL

The invention claimed is:

1. A monitoring signal light output apparatus comprising:
a first optical demultiplexer inserted into a first optical fiber included in a submarine optical cable into which a submarine apparatus is inserted and configured to demultiplex a first monitoring signal light transmitted by the first optical fiber;
a second optical demultiplexer inserted into a second optical fiber that is included in the submarine optical cable and transmits a signal light in a direction opposite to the first optical fiber, and configured to demultiplex a second monitoring signal light transmitted by the second optical fiber;
a semiconductor optical amplifier configured to amplify the first monitoring signal light separated by the first optical demultiplexer and modulate the first monitoring signal light, amplify the second monitoring signal light separated by the second optical demultiplexer and input in a direction opposite to the first monitoring signal light, and modulate the second monitoring signal light;
a control unit configured to output a control signal indicating a state of the submarine apparatus;
a drive unit configured to output a drive signal to the semiconductor optical amplifier in response to the control signal to perform modulation operations of the first and second monitoring signal lights;
a first optical multiplexer configured to multiplex the first monitoring signal light amplified and modulated by the semiconductor optical amplifier into a signal light transmitted by the first optical fiber; and
a second optical multiplexer configured to multiplex the second monitoring signal light amplified and modulated by the semiconductor optical amplifier to the signal light transmitted by the second optical fiber, wherein
the monitoring signal light output apparatus is mounted on the submarine apparatus.

2. The monitoring signal light output apparatus according to claim 1, further comprising:
a first optical isolator inserted into an optical transmission line connecting the first optical demultiplexer and the semiconductor optical amplifier, and configured to allow the first monitoring signal light to pass therethrough and block the signal light transmitted in the direction opposite to the first monitoring signal light; and
a second optical isolator inserted into an optical transmission line connecting the second optical demultiplexer and the semiconductor optical amplifier, and configured to allow the second monitoring signal light to pass therethrough and block the signal light transmitted in the direction opposite to the second monitoring signal light.

3. A submarine apparatus comprising:
a first optical demultiplexer inserted into a first optical fiber included in a submarine optical cable and configured to demultiplex a first monitoring signal light transmitted by the first optical fiber;
a second optical demultiplexer inserted into a second optical fiber that is included in the submarine optical cable and transmits a signal light in a direction opposite to the first optical fiber, and configured to demultiplex a second monitoring signal light transmitted by the second optical fiber;
a semiconductor optical amplifier configured to amplify the first monitoring signal light separated by the first optical demultiplexer and modulate the first monitoring signal light, amplify the second monitoring signal light separated by the second optical demultiplexer and input in a direction opposite to the first monitoring signal light, and modulate the second monitoring signal light;
a control unit configured to output a control signal indicating a state of the submarine apparatus;
a drive unit configured to output a drive signal to the semiconductor optical amplifier in response to the control signal to perform modulation operations of the first and second monitoring signal lights;
a first optical multiplexer configured to multiplex the first monitoring signal light amplified and modulated by the semiconductor optical amplifier to a signal light transmitted by the first optical fiber; and
a second optical multiplexer configured to multiplex the second monitoring signal light amplified and modulated by the semiconductor optical amplifier to the signal light transmitted by the second optical fiber.

4. An optical communication system comprising:

a submarine optical cable connecting a first optical transmission apparatus and a second optical transmission apparatus; and a submarine apparatus inserted into the submarine optical cable, wherein the submarine apparatus comprises:

- a first optical demultiplexer inserted into a first optical fiber included in the submarine optical cable, and configured to demultiplex a first monitoring signal light output from the first optical transmission apparatus and transmitted through the first optical fiber;
- a second optical demultiplexer inserted into a second optical fiber that is included in the submarine optical cable and transmits a signal light in a direction opposite to the first optical fiber, and demultiplex a second monitoring signal light output from the second optical transmission apparatus and transmitted through the second optical fiber;
- a semiconductor optical amplifier configured to amplify the first monitoring signal light separated by the first optical demultiplexer and modulate the first monitoring signal light, amplify the second monitoring signal light separated by the second optical demultiplexer and input in a direction opposite to the first monitoring signal light, and modulate the second monitoring signal light;
- a control unit configured to output a control signal indicating a state of the submarine apparatus;
- a drive unit configured to output a drive signal to the semiconductor optical amplifier in response to the control signal to perform modulation operations of the first and second monitoring signal lights;
- a first optical multiplexer configured to multiplex the first monitoring signal light amplified and modulated by the semiconductor optical amplifier to a signal light transmitted by the first optical fiber and output a multiplexed signal light to the second optical transmission apparatus; and
- a second optical multiplexer configured to multiplex the second monitoring signal light amplified and modulated by the semiconductor optical amplifier to the signal light transmitted by the second optical fiber and output a multiplexed signal light to the first optical transmission apparatus.

* * * * *